United States Patent
Onyiagha

(12) 
(10) Patent No.: US 6,377,545 B1
(45) Date of Patent: *Apr. 23, 2002

(54) OPEN LOOP ADAPTIVE ACCESS CONTROL OF ATM NETWORKS USING A NEURAL NETWORK

(75) Inventor: Godfrey Onyiagha, High Wycombe (GB)

(73) Assignee: Telefonaktiebolaget LM Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/874,906

(22) Filed: Jun. 16, 1997

(30) Foreign Application Priority Data

Nov. 18, 1996 (GB) ............................... 9623919

(51) Int. Cl.⁷ .............................. H04J 1/16; H04L 12/28
(52) U.S. Cl. ..................... 370/230; 370/395.2
(58) Field of Search ............................. 370/230, 231, 370/235, 395, 397, 412, 413, 465, 252, 254, 255, 468, 395.1, 395.2, 395.21; 706/15, 20, 21, 23, 41

(56) References Cited

U.S. PATENT DOCUMENTS

| | | | |
|---|---|---|---|
| 5,263,121 A | | 11/1993 | Melsa et al. |
| 5,287,347 A | * | 2/1994 | Spanke ........................ 370/235 |
| 5,357,507 A | * | 10/1994 | Hughes et al. .............. 370/395 |
| 5,497,375 A | * | 3/1996 | Hluchyj et al. ............. 370/395 |
| 5,511,066 A | * | 4/1996 | Witters et al. ............... 370/395 |
| 5,564,115 A | * | 10/1996 | Clarkson ...................... 395/27 |
| 5,687,292 A | * | 11/1997 | Boda et al. .................... 395/11 |
| 5,691,975 A | * | 11/1997 | Hamada et al. ............. 370/235 |
| 5,796,735 A | * | 8/1998 | Miller et al. ................. 370/395 |
| 5,825,750 A | * | 10/1998 | Thompson .................. 370/244 |
| 5,828,653 A | * | 10/1998 | Goss ........................... 370/230 |

FOREIGN PATENT DOCUMENTS

| | | |
|---|---|---|
| WO | 94/24637 | 10/1994 |
| WO | 95/34979 | 12/1995 |

OTHER PUBLICATIONS

Guan et al, The application of noisy reward/penalty learning to pyramidal pRAM structure, IEEE, 1992.*

Lee et al, A Neutral Network Based ATM Call Admission Controller for Multiple Service Classes with Different Qos, IEEE, May 1996.*

(List continued on next page.)

Primary Examiner—Chau Nguyen
Assistant Examiner—Andy Lee
(74) Attorney, Agent, or Firm—Burns, Doane, Swecker & Mathis, L.L.P.

(57) ABSTRACT

A pyramidal pRAM neural network is used in an access control scheme for an ATM node, or other switch handling bursty traffic. Specifically, the neural network is a configured in a teacher forcing mode, and is trained either off-line or on-line. Cells arriving at the node, which are found to violate agreed quality of service parameters, may be dropped, depending on the expected state of the switch buffers, based on expected traffic arrival rates, but the control is adaptive, which means that violating cells may be allowed to gain access to the node, if the state of the switch allows it. Control is open-loop, which means that the response can be quicker.

24 Claims, 3 Drawing Sheets

OTHER PUBLICATIONS

Sarajedini et al, Quality of Service Prediction using Neural Network, IEEE, Aug. 1990.*

J, Austin, A review of RAM based neural networks, IEEE, Sep. 1994.*

Onyiagha G. et al., "Probabilistic–RAM Neural Networks In ATM Traffic Shaping and Policing", Proc. Int. Conf. on Engineering Applications of Neural Networks, Jun. 17–19, 1996, pp. 229–232.

Godfrey Onyiagha et al., "Adaptive Access Control of ATM Traffic Using Neural Networks", IEEE Document No. 0–7803–3336–5/96, Nov. 16, 1996, pp. 201–205.

Onyiagha G. et al., "Adaptive Access Control of ATM Traffic Using Neural Networks", A Collaborative Research Project Between Ericsson Components Ltd. and King's College London Under the PRI Scheme, Nov. 16, 1996, pp. 1–18.

United Kingdom Patent Office Search Report.

* cited by examiner

OPEN LOOP ADAPTIVE ACCESS CONTROL OF ATM NETWORKS USING A NEURAL NETWORK

TECHNICAL FIELD OF THE INVENTION

The present invention relates an access control mechanism, for a telecommunications device, for example an ATM switch.

DESCRIPTION OF RELATED ART

It is widely expected that ATM networks will enable the satisfaction of performance requirements of a whole variety of services, such as voice, video, and data on a single infrastructure. To achieve this, ATM networks must provide traffic control management.

A problem which arises in ATM switches is due to the random nature of ATM traffic. The switch control elements must be able to cope with variations in traffic.

The performance of an ATM network can be defined in terms of the Quality of Services (QoS) requirements which must be delivered to the network subscriber. These performance measures include: the network throughput, latency, jitter or delay variation, and the amount of cell loss that can be tolerated.

A network provider may agree to handle a certain number of cells (units of traffic) from a particular subscriber. It is then necessary for the network provider to have an access control system, which verifies that the subscriber is not supplying excess traffic to the network. In the limit, this excess traffic might not be allowed to access the network, depending on demands from other users.

SUMMARY OF THE INVENTION

The present invention provides a method for open-loop adaptive control of access to a broadband packet data type telecommunications network. Based on expected future data arrival patterns, data which violate agreed quality of service parameters may be denied access to the network.

The present invention relates to the use of neural networks, specifically pRAM (probabilistic RAM), networks in ATM switch design, as part of the access control system. Since the pRAM learns very fast, and has been shown to posses excellent generalisation properties in noisy environments, it is very suitable to cope with the stochastic nature of broadband ATM traffic. A pyramidal probabilistic RAM, configured in a teacher forcing mode, provides the required control. The pRAM may be trained off-line, before being integrated as the control element of an ATM node, or on-line.

Specifically, the neural network is trained to be able to predict incoming traffic flows to the switch. If incoming data is such that it is probable, based on the expected future traffic, that such future traffic will be unable to access the switch, then the incoming data may be denied access to the switch.

DETAILED DESCRIPTION OF PREFERRED EMBODIMENTS

Figure 1:
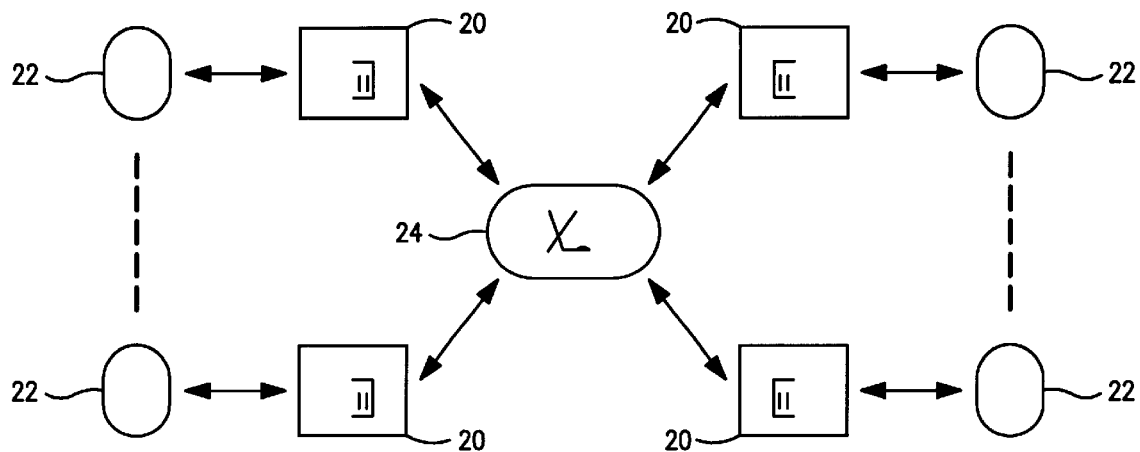
FIG. 1 is a schematic diagram of a system embodying the/invention.

In characterising ATM traffic, one of the main objectives is to quantify the distribution of the largely unknown high bit-rate traffic sources by, for example, sending them through a "real" network and subsequently to use past experience to predict the future behaviour. For such sources, accurate performance models can be determined from the measurement of the interarrival times of cells, their peak and mean bit rates, standard deviation, and second order statistical moment terms. Measurement procedure usually considers a certain time period during which ATM cells (packets) arrive in sequence at a virtual channel. These performance parameters, especially those describing the duration of, and intervals between arrivals may become part of the contract describing the bandwidth of a virtual channel. Therefore with several multiplexed channels, some form of control is required to maintain overall performance objective functions (collectively referred to as Quality of Service—QoS). These parameters have to be negotiated and agreed upon between the subscriber and the network operator or between adjacent network nodes. Once a contract is agreed, the traffic has to be continuously monitored for conformance. During an established connection, this monitoring function is variously referred to as credit management, usage parameter control or access control. Access control includes traffic shaping that involves the clipping, discarding and/or the delaying of cells within the arrival sequence in order to change this sequence from that which violates the agreed contract or QoS, to that which does not. When this function is performanced by the network itself as the traffic enters it, it is usually referred to as traffic policing. In general, the process of traffic shaping and policing (or traffic filtering) is basically one of monitoring cell dropping probability, and to smooth out the variable traffic.

A basic requirement for a policing function is that it should be transparent from the point of view of an end user who complies with the agreed QoS; and at the same time it must provide the network operator with an adaptive and preventive way of enforcing tariffs. Mechanisms for accomplishing this task must be able to take into account certain tolerance requirements whereby if for instance, a negotiated characteristic is violated, the mechanism has to "look" over a specific interval of time, to see if this violation is within an acceptable range based on the conditions within the network. That is, the scheme has to be tolerant over time before imposing any enforcement.

The present invention relates to the use of the neural network to provide the required adaptivity or intelligence in the policing process. This principle may be applied to an ATM node, or to a base station in a mobile radio telephone network; indeed it may usefully be applied to any node which receives bursty traffic.

If the statistically time independent is characteristics of the new and existing connections are known, then what is desirable is to exert a more direct and preventive access control on individual cell streams at the nodal switching point. An efficient access control has to be adaptive and fast (short delay), in order to cope well with the high bit rate traffic expected for example in ATM networks. Thus, conventional access control schemes, which react only slowly to incoming data packets, are unable to handle such traffic.

The pRAM neural network provides an adaptive approach to the solution of the optimal delay and throughput. It learns to approximate a real-valued function at its input, such as source arrival distribution, e.g. Poisson distribution in our case. In one embodiment of the invention, the neural network may be trained off-line with the ideal traffic arrival pattern (as given by equation 1). The neural network learns the variation over time of the data transition probability, in order to predict the pattern of incoming information. The function approximation proceeds by integrating a series of pulses over a given period, and updating the memory contents on a pulse signal basis using the reinforcement algorithm described in Onyiagha et al, "Probabilistic RAM Neural Networks in ATM Traffic Shaping and Policing", Proc. Int. Conf. on Engineering Applications of Neural Networks pp 229-232, Jun. 17–19 1996, the contents of which are hereby incorporated herein by reference.

FIG. 1 is a schematic illustration of a network embodying the invention.

As is known, a series of InterWorking Units (IWU) or ATM layer adapters 20 serve to interface existing respective LAN traffic sources 22 to an ATM based switch 24. The IWU takes packets from routers and segments them into ATM cells; queues up and clocks out the cells from ATM Layer; processes cells received from the network (reassembled packets from cells); and determines the route to destination (ATM layer routing).

FIG. 1 shows four such traffic sources and layer adapters, although it will be appreciated that a real network will potentially include many more such devices.

Figure 2:
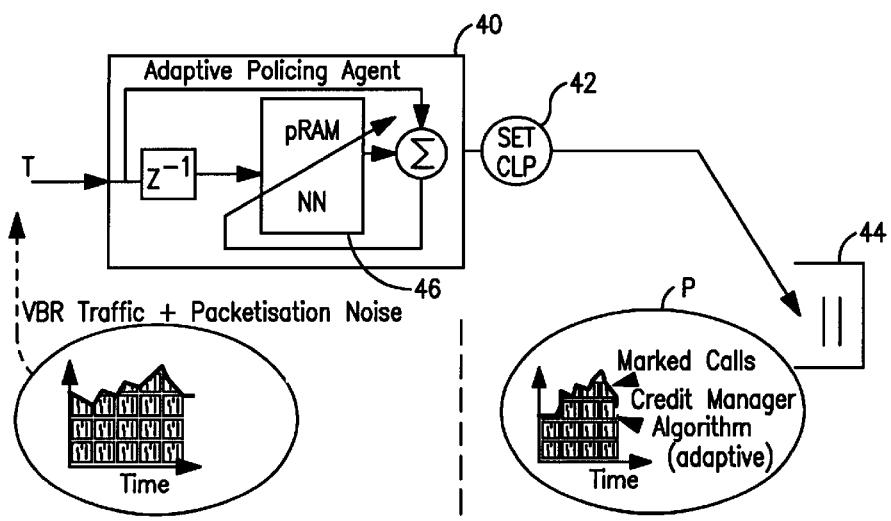
FIG. 2 is a more detailed illustration of the control scheme used in accordance with the invention.

FIG. 2 shows in more detail the open-loop adaptive access control scheme in accordance with the invention. A noisy traffic source T acts as a source of cells, which can be assumed to enter the queue with a Poisson distribution. The traffic typically includes variable bit rate (VBR) traffic, plus noise resulting from channel impairment such as RF interference, and packetisation noise.

A pRAM controller 40 on the input of the layer adapter 20 acts as an adaptive policing agent. In this embodiment, the pRAM acts as a part of Connection Admission Control (CAC) system and it compares the probability of the actual buffer occupancy with the probability that it has been trained for, taking into consideration the defined value of tolerance. The pRAM is connected to a module 42 which sets a cell loss priority (CLP) bit for each cell that violates QoS requirements. Connected thereto is a module that is responsible for sending cells to the buffer as output traffic P, and then to the network. Cells for which the CLP bit has been set will be allowed to enter the queue only if there are places left in the buffer, otherwise they will be the first to be discarded.

The pRAM controller 40 includes a pRAM neural network 46, which monitors the number of cells in the buffers 44, and takes into consideration the expected arrival rate of future cells. If a subscriber transmits cells which go beyond those which the network provider has agreed to accept, the neural network determines whether those cells can be allowed access to the switch, or whether the CLP bit will be set, which will mean that the cells may be discarded.

Thus, in accordance with this invention, access control can be applied within the ATM on every virtual channel.

It will be noted that the access control is performed in an open-loop structure, that is, there is no feedback from the access controller to the source. This allows a fast response to incoming traffic.

Figure 3:
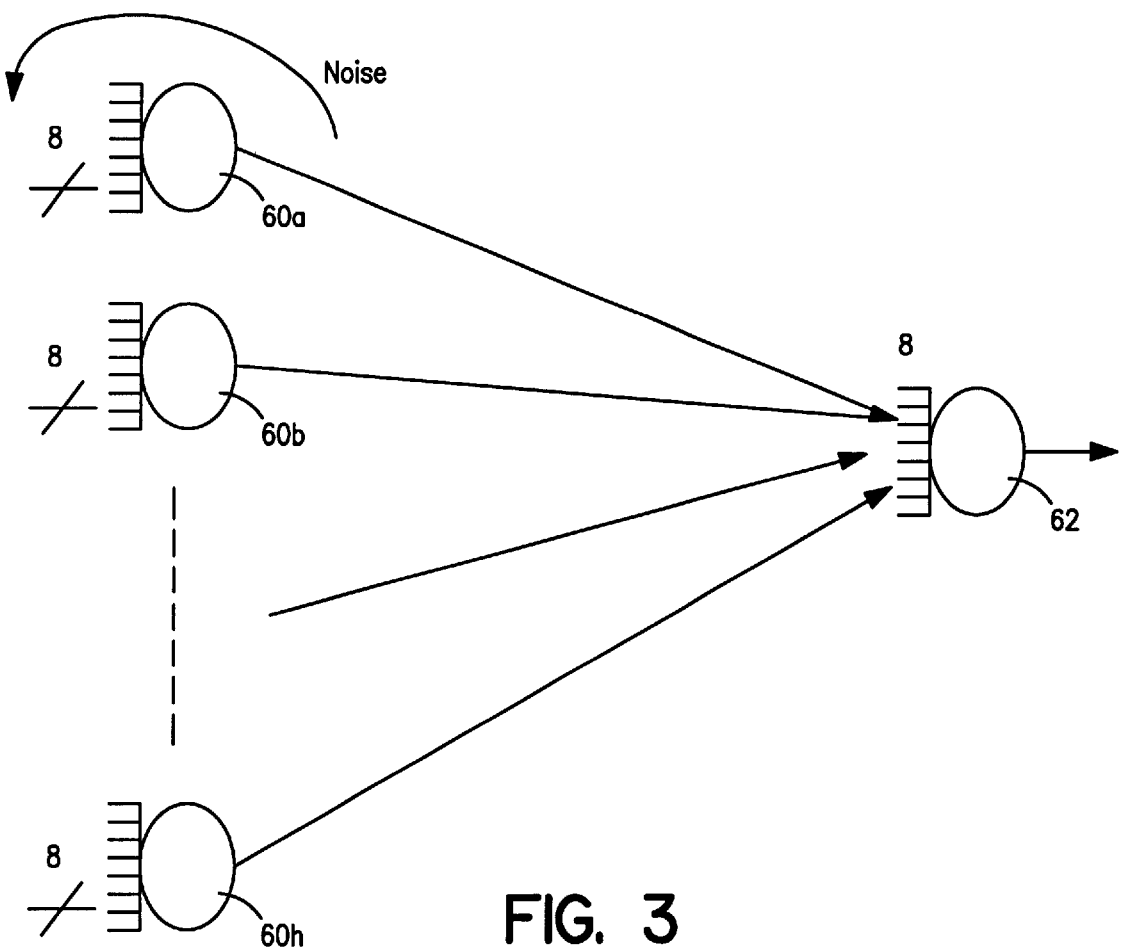
FIG. 3 is a schematic diagram of an access controller used in accordance with the invention.

FIG. 3 is a more detailed illustration of the pRAM neural network itself. Advantageously, the network includes a first layer made up of eight neurons 60a–60h, each with eight inputs, and a single second layer neuron 62, again with eight inputs, which is connected to receive outputs from the eight first-layer neurons. Such a pyramidal structure, using only nine neurons, is particularly advantageous in that it is able to react quickly to incoming traffic. Moreover, this structure is well able to make use of a desirable property of the pRAM neuron, namely its ability to be implemented in hardware, particularly in view of its efficient structure.

Thus, we use the pRAM neural network's ability to solve real-time adaptive variable pattern problems, to optimize the relationship between the speed of response and the ability to police violations. Moreover, the policing can be adaptive. That is, the controller can determine whether incoming traffic which violates agreed quality of service parameters can in fact be allowed to gain access to the network.

A description will now be given of the operation of the neural network itself, and in particular of the way in which the network is trained.

The method uses the relationship between the average traffic arrival rate and the state probabilities of the network link capacity at the end of each arrival and departure time slot, in order to be able to predict the latter. The source traffic arrival pattern is approximated by its quantised equivalent, and is then transmitted as a Markov Modulated Poisson probability distribution for use as a training vector for the neural network.

It has been determined that eleven quantised levels of the incoming variable bit rate source are sufficient to provide an accurate representation of the traffic for calculating buffer link occupancy. Thus, it is advantageous to use no more than eleven such levels, because further quantisation carries with it an overhead in terms of the required system resource.

In the field of digital signal processing, a real valued number (x) can be represented by an N-bit binary code or vector $(b_1 b_2 \ldots b_N)$ such that $$x = \sum_{j=1}^{N} b_j 2^{-j},$$

where
$b_j=1$ given that the representation equation is $\geq 2^{-j}$; and $b_j=0$ below this subrange. Alternatively, the real number can be represented by a stochastic pulse train $(S_i)$ of fixed length (L), such that the Prob $(S_i=1/\text{input } x)=x$. in either case, the statistical behaviour of the quantisation error or noise $\epsilon=Q$ (x)−x (especially when x is a random variable belonging to a sequence or pattern) clearly depends on the approximation associated with the type of representation. The pRAM neural network, because of its inherent probabilistic characteristics, learns to approximate a real-valued function from its given set of P training patterns $x_p \epsilon [0,1]^N$, and their corresponding desired outputs $d_p \epsilon [0, 1,]$. The function approximation proceeds by integrating a series of pulses over a given period, and updating the memory contents on a pulse signal basis using a reinforcement is algorithm. The principle of our approach together with its binary equivalent analysis is fully described in Guan Y., et al, "Function Learning with Stochastic Spike Train Input: Weight Compensation by Learning Rate Adjustment", WCNN'95 V-III, the contents of which are hereby incorporated by reference.

Figure 4:
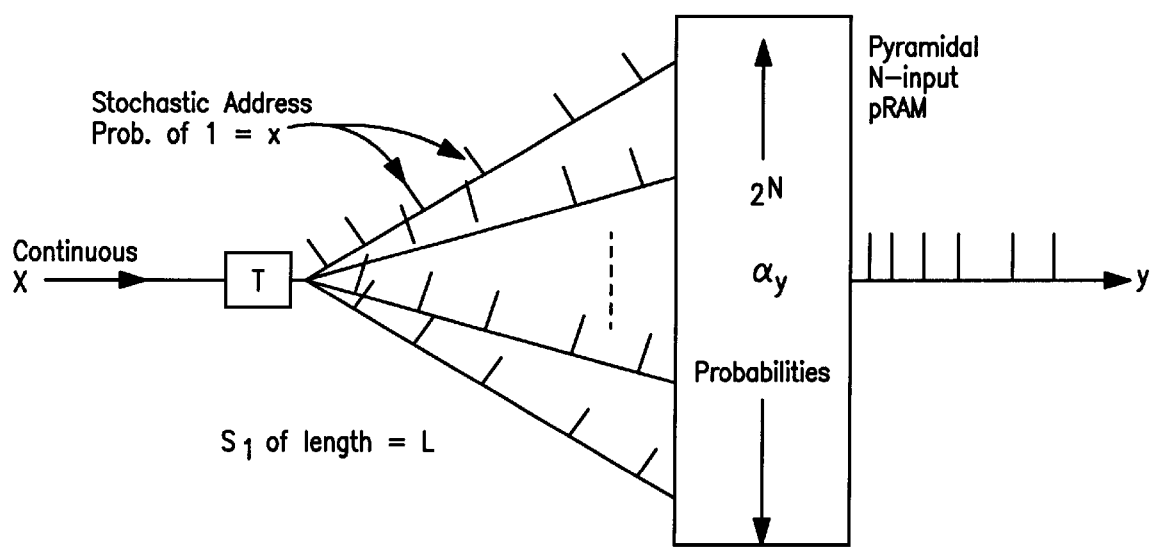
FIG. 4 is a representation of the artificial neural network used in accordance with the invention.

Given our training data set of patterns P={$(x_1, d_1), (x_2, d_2) \ldots, (x_p, d_p)$} where variable $x_p \epsilon [0, 1]$ is represented by a pulse train of length L, then the pRAM output is a string of pulses which results by comparing a given stochastic address with the stored probability values at the spread of addressed locations, as shown in FIG. 4.

In other words over time steps L$\epsilon$ 1 . . . L, each $x_j$ of P is represented by a pulse stream $S_{ij}$ in which Prob $(S_{ij}=1)=x_j$.

Using the noise associated with $x_j$, the spread of locations u are accessed, thereby providing the variation about the mean (and consequently the generalisation) of necessary weights to stochastically contribute a '1' or '0' to the output stream (y) given by:

$$y = \sum_u \alpha_u X_u(x)$$

$\alpha_u$ is the weight variable representing a probability value continuous in the range [0, 1] stored in location u, and the accessing probability $x_u$ is given $$\text{by} \prod_{j=1}^{N}[u_j x_j + (1-u_j)(1-x_j)].$$

If during L, the number of accesses to u is $S_u \in 0, 1 \ldots L$, and the total number of emitted '1's is denoted by $A_u \in 0, 1 \ldots L$, then clearly $$\sum_u S_u = L, \hat{X}_u = S_u/L,$$

and the approximation for the output is given by:

$$\hat{y}(L) = \frac{1}{L} A_u$$

Whilst the output ŷ (L) is being accumulated, the memory update rule uses reinforcement technique to generate reward (r) and penalty (p) signals from the relationship:

$$\Delta \alpha_u = \frac{\rho}{L}[(A_u - \alpha_u S_u)r - \lambda(A_u - (1-\overline{\alpha_u})S_u)p]$$

where ρ is the learning rate and λ(not the same as cells arrival rate) is the decay rate.

In practice, random memory accessing is achieved by binary vector addressing. The direct approximation of such address value may result in memory content being driven to their limiting binary values (i.e. saturate) due to favoured addressing probability to those locations. To avoid this, and to provide equal addressing probability a transformation tubular "T" is used to interpolate the input, as shown in FIG. 4. Details of the training method are reported in Guan Y. et al, "A Stochastic Reverse Interpolation Algorithm for Real-Valued Function Learning", 3rd IEE Int. Conf. on Artificial Neural Networks, Brighton, May 1993.

We assume that bit rate signal variation with time can be measured by a bit rate histogram or probability distribution function. For example, the cells within a quantised frame (i) of a video source are transmitted as a Poisson stream to an ATM access multiplexer. In each frame interval the transition from one level (state) to the other, can be modelled as an eleven (shown sufficient to accurately represent the distribution of arrivals) state discrete-time Markov chain which serves to modulate an underlying Poisson arrival process. The arrival rate $\lambda_i$ then corresponds to the cells in cells/sec being transmitted in that state. Determining the model parameters such as the transition probability of the quantised levels can be achieved through statistical means and calculating the auto-covariance function of an actual sequence. However the difficulty is in the large number of probabilities to be calculated uniquely.

The pRAM neural network is used to learn quickly the parameters which accurately model the properties of the traffic source.

As already mentioned above, the output y of the pRAM is a polynomial approximation of the normalised continuous input $x_p \in [0, 1]$. The order of the polynomial needs to be large enough to obtain a reasonable approximation accuracy, which requires $x_p$ to be connected to the neural network more than once and therefore requires multiple pRAM nodes to realise this. As described above, our preferred policing function model consists of a pyramidal pRAM neural network driven by a video source on to an ATM network. The neural network contains eight neurons each of eight-input in the first layer which fan-in to one eight-input node in the output layer.

The probability distribution, for cell arrival rates versus buffer occupancy, determined by the neural network, is then used for policing the traffic source.

Thus, the policing function, used as an access control scheme, uses a pRAM neural network as an effective method which learns from a given traffic rate of arrival over a fixed time period. The method combines the efficiency of several existing methods such as the leaky bucket and moving window mechanisms, but does not have the high complexity of these schemes. The rate of arrival is converted to stochastic pulse address before being accumulated over a period of time corresponding to the interval of time required to discern the cells' arrival probability distribution.

Thus, as described above, the access controller is configured in a teacher forcing mode.

Moreover, an advantage of the fact that the neural network is trained using a source, to which uniformly distributed white noise has been added, is that the access controller acts to filter out such noise, for example resulting from RF interference or from packetisation, from incoming traffic.

In another embodiment of the invention, the Probabilistic Random Access Memory Neural Network may be trained on-line to learn the stochastic arrival pattern of cells at an ATM switching node during a given time slot. The control algorithm is then applied to achieve adaptive access control of both homogenous and inhomogeneous sources.

Thus, in accordance with the invention, the probability of a high rate of arrival of cells in the near future can then be used, in conjunction with information about buffer occupancy, to determine whether it is acceptable to permit access to cells received from subscribers in excess of traffic levels agreed with those subscribers. Use of the access control mechanism in accordance with the invention allows the control to be adaptive, and to respond quickly to incoming traffic.

What is claimed is:

1. An access control method in an interface for an asynchronous transfer mode device, wherein the asynchronous transfer mode device comprises at least one buffer, the method comprising:

receiving traffic from a plurality of sources, the received traffic comprising received cells;

determining whether received traffic from a first subscriber complies with an agreed traffic level associated with the first subscriber;

if said received traffic complies with the agreed traffic level, allowing said traffic access to said asynchronous transfer mode device;

if said received traffic does not comply with the agreed traffic level, determining by means of an access control device whether to allow said traffic access to said asynchronous transfer mode device;

wherein said access control device comprises a neural network, which receives information about buffer occupancy in said asynchronous transfer mode device, and determines a probability distribution relating to future cell arrival parameters, in order to determine whether to allow said traffic access to said asynchronous transfer mode device.

2. An access control method as claimed in claim 1, wherein said access control device comprises a probabilistic random access memory neural network.

3. An access control method as claimed in claim 1, wherein said access control device comprises a pyramidal probabilistic random access memory neural network.

4. An access control method as claimed in claim 1, wherein said access control device determines the probability distribution relating to future cell arrival rates on the basis of training with a model traffic arrival pattern.

5. An access control method as claimed in claim 1, wherein said access control device determines the probability distribution relating to future cell arrival rates on the basis of training with a model traffic arrival pattern, to which white noise has been added.

6. An access control method in an interface for an asynchronous transfer mode device, the method comprising:
  receiving traffic from a plurality of sources, the received traffic comprising received cells;
  determining whether received traffic from a first subscriber complies with an agreed traffic level associated with the first subscriber;
  if said received traffic complies with the agreed traffic level, allowing said traffic access to said asynchronous transfer mode device;
  if said received traffic does not comply with the agreed traffic level, determining by means of an open-loop access control device whether to allow said traffic access to said asynchronous transfer mode device;
  wherein said open-loop access control device comprises a neural network, which determines a probability distribution relating to future cell arrival rates, in order to determine whether to allow said traffic access to said asynchronous transfer mode device; and
  wherein actual cell arrival rates are used to train the neural network to allow it to determine the probability distribution relating to future cell arrival rates.

7. An access control method as claimed in claim 6, wherein said access control device comprises a probabilistic random access memory neural network.

8. An access control method as claimed in claim 6, wherein said access control device comprises a pyramidal probabilistic random access memory neural network.

9. An access control method as claimed in claims 6, wherein said neural network determines whether to allow said traffic access to said asynchronous transfer mode device on the basis of learnt parameters relating to an arrival pattern of said traffic, and on the basis of information relating to buffer occupancy in said asynchronous transfer mode device.

10. An access control method in an interface for an asynchronous transfer mode device, the method comprising:
  receiving traffic from a plurality of sources, the received traffic comprising received cells;
  determining whether received traffic from a first subscriber complies with an agreed traffic level associated with the first subscriber;
  if said received traffic complies with the agreed traffic level, allowing said traffic access to said asynchronous transfer mode device;
  if said received traffic does not comply with the agreed traffic level, determining by means of an access control device comprising a neural network whether to allow said traffic access to said asynchronous transfer mode device;
  if it is determined to allow a cell of said traffic access to said asynchronous transfer mode device, when said traffic does not comply with the agreed traffic level, setting a cell loss priority bit for said cell; and
  in said asynchronous transfer mode device, preferentially discarding cells for which said cell loss priority bit has been set.

11. An access control method as claimed in claim 10, wherein said asynchronous transfer mode device comprises a buffer, and wherein cells, for which said cell loss priority bit has been set, are discarded if there are no places left in said buffer.

12. An access control method in an interface for an asynchronous transfer mode device, wherein the asynchronous transfer mode device comprises at least one buffer, the method comprising:
  receiving traffic from a plurality of sources, the received traffic comprising received cells;
  determining whether received traffic from a first subscriber complies with an agreed traffic level associated with the first subscriber;
  if said received traffic complies with the agreed traffic level, allowing said traffic access to said asynchronous transfer mode device;
  if said received traffic does not comply with the agreed traffic level, determining by means of an access control device whether to allow said traffic access to said asynchronous transfer mode device,
  wherein said access control device comprises a neural network, which receives information about buffer occupancy in said asynchronous transfer mode device, and determines a probability distribution relating to future cell arrival rates, in order to determine whether to allow said traffic access to said asynchronous transfer mode device on the basis of said information about buffer occupancy and said probability distribution relating to future cell arrival rates,
  if it is determined to allow a cell of said traffic access to said asynchronous transfer mode device, when said traffic does not comply with the agreed traffic level, setting a cell loss priority bit for said cell; and
  in said asynchronous transfer mode device, preferentially discarding cells for which said cell loss priority bit has been set, if said buffer is occupied.

13. An interface for an asynchronous transfer mode device, wherein the asynchronous transfer mode device comprises at least one buffer, the interface comprising:
  means for receiving traffic from a plurality of sources, the received traffic comprising received cells;
  means for determining whether received traffic from a first subscriber complies with an agreed traffic level associated with the first subscriber;
  means for allowing said traffic access to said asynchronous transfer mode device, if said received traffic complies with the agreed traffic level; and
  an access control device for determining whether to allow said traffic access to said asynchronous transfer mode device, if said received traffic does not comply with the agreed traffic level;
  wherein said access control device comprises a neural network, which receives information about buffer occupancy in said asynchronous transfer mode device, and determines a probability distribution relating to future cell arrival parameters, in order to determine whether to allow said traffic access to said asynchronous transfer mode device.

14. The interface as claimed in claim 13, wherein said access control device comprises a probabilistic random access memory neural network.

15. The interface as claimed in claim 13, wherein said access control device comprises a pyramidal probabilistic random access memory neural network.

16. The interface as claimed in claim 13, wherein said access control device determines the probability distribution relating to future cell arrival rates on the basis of training with a model traffic arrival pattern.

17. An interface as claimed in claim 13, wherein said access control device determines the probability distribution relating to future cell arrival rates on the basis of training with a model traffic arrival pattern, to which white noise has been added.

18. An interface for an asynchronous transfer mode device, the interface comprising:
    means for receiving traffic from a plurality of sources, the received traffic comprising received cells;
    means for determining whether received traffic from a first subscriber complies with an agreed traffic level associated with the first subscriber;
    means for allowing said traffic access to said asynchronous transfer mode device, if said received traffic complies with the agreed traffic level;
    an open-loop access control device for determining whether to allow said traffic access to said asynchronous transfer mode device, if said received traffic does not comply with the agreed traffic level;
    wherein said open-loop access control device comprises a neural network, which determines a probability distribution relating to future cell arrival rates, in order to determine whether to allow said traffic access to said asynchronous transfer mode device; and
    wherein actual cell arrival rates are used to train the neural network to allow it to determine the probability distribution relating to future cell arrival rates.

19. The interface as claimed in claim 18, wherein said access control device comprises a probabilistic random access memory neural network.

20. The interface as claimed in claim 18, wherein said access control device comprises a pyramidal probabilistic random access memory neural network.

21. The interface as claimed in claim 18, wherein said neural network determines whether to allow said traffic access to said asynchronous transfer mode device on the basis of learnt parameters relating to an arrival pattern of said traffic, and on the basis of information relating to buffer occupancy in said asynchronous transfer mode device.

22. An asynchronous transfer mode device comprising:
    means for receiving traffic from a plurality of sources, the received traffic comprising received cells;
    means for determining whether received traffic from a first subscriber complies with an agreed traffic level associated with the first subscriber;
    means for allowing said traffic access to said asynchronous transfer mode device, when said received traffic complies with the agreed traffic level;
    an access control device comprising a neural network, for determining whether to allow said traffic access to said asynchronous transfer mode device, when said received traffic does not comply with the agreed traffic level;
    means for setting a cell loss priority bit for said cell, when it is determined to allow a cell of said traffic access to said asynchronous transfer mode device, when said traffic does not comply with the agreed traffic level; and
    means for preferentially discarding cells for which said cell loss priority bit has been set.

23. The asynchronous transfer device as claimed in claim 22, comprising:
    a buffer; and
    means for discarding cells, for which said cell loss priority bit has been set, when there are no places left in said buffer.

24. An asynchronous transfer mode device, comprising:
    at least one buffer;
    means for receiving traffic from a plurality of sources, the received traffic comprising received cells;
    means for determining whether received traffic from a first subscriber complies with an agreed traffic level associated with the first subscriber;
    means for allowing said traffic access to said asynchronous transfer mode device, when said received traffic complies with the agreed traffic level;
    an access control device for determining whether to allow said traffic access to said asynchronous transfer mode device, when said received traffic does not comply with the agreed traffic level;
    wherein said access control device comprises a neural network, which receives information about buffer occupancy in said asynchronous transfer mode device, and determines a probability distribution relating to future cell arrival rates, in order to determine whether to allow said traffic access to said asynchronous transfer mode device on the basis of said information about buffer occupancy and said probability distribution relating to future cell arrival rates,
    means for setting a cell loss priority bit for said cell, when it is determined to allow a cell of said traffic access to said asynchronous transfer mode device, when said traffic does not comply with the agreed traffic level; and
    means for preferentially discarding cells for which said cell loss priority bit has been set, when said buffer is occupied.

* * * * *